United States Patent [19]

Niemeyer, III

[11] Patent Number: 4,763,140

[45] Date of Patent: Aug. 9, 1988

[54] ROTARY ACTION GRAPHIC RECORDING SYSTEM

[75] Inventor: Robert H. Niemeyer, III, Martinez, Calif.

[73] Assignee: AM International Corporation, Chicago, Ill.

[21] Appl. No.: 75,533

[22] Filed: Jul. 20, 1987

[51] Int. Cl.$^4$ ............................................. G01D 15/16
[52] U.S. Cl. .................................. 346/139 R; 346/46; 346/141
[58] Field of Search ................. 346/139 R, 29, 46, 49, 346/108, 141

[56] References Cited

U.S. PATENT DOCUMENTS 4,500,890  2/1985  Nicholas .......................... 346/139 R
4,578,683  3/1986  Gordon ............................ 346/139 R Primary Examiner—E. A. Goldberg
Assistant Examiner—Mark Reinhart
Attorney, Agent, or Firm—Roy A. Ekstrand; Nicholas A. Camasto

[57] ABSTRACT

A rotary action graphic recording system includes a pen carriage supporting a plurality of recording pens in a linear array together with means for moving the pen carriage in a carriage path. Rotary actuation means are supported by and operative upon the pen carriage to engage selected ones of the recording pens for movement into contact with the recording media. The rotary actuating means are operated by an elongated actuator beam supported in parallel with the carriage path and coupled to the rotary actuating means. Brake means within the rotary actuator are provided which are operative to engage the actuator beam and permit alignment of the rotary actuator with a selected pen within the pen carriage array by movement of the pen carriage.

12 Claims, 3 Drawing Sheets

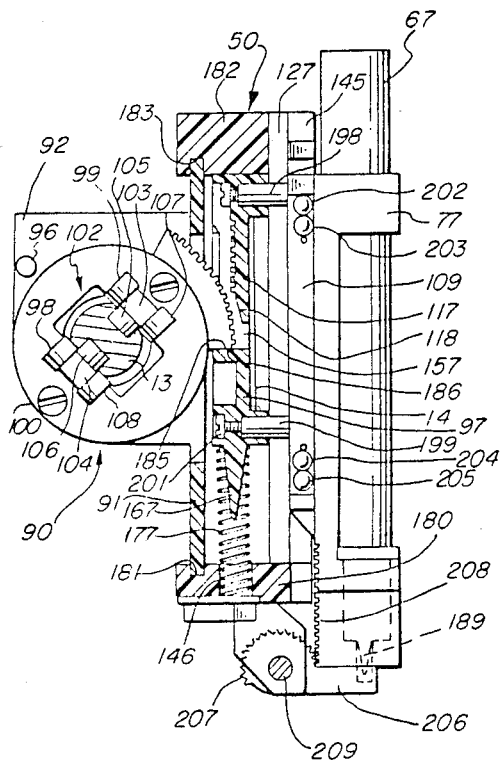
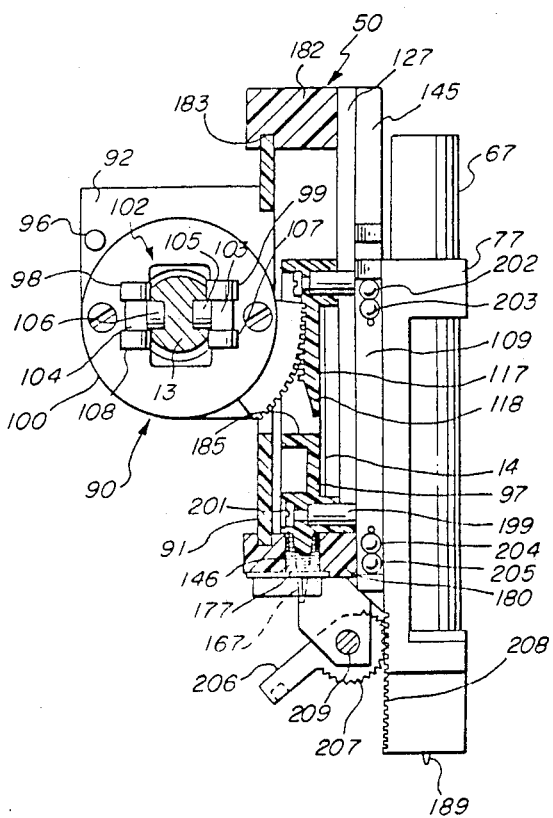
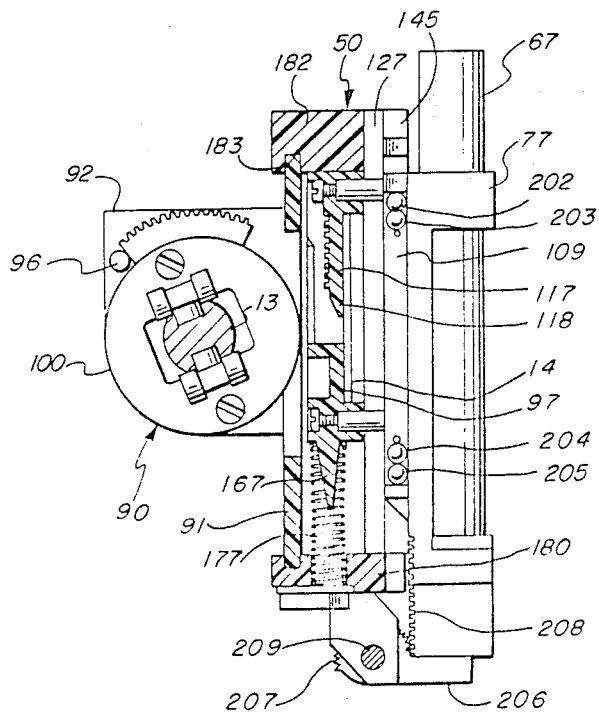

ROTARY ACTION GRAPHIC RECORDING SYSTEM

CROSS REFERENCE TO RELATED APPLICATIONS

This application discloses apparatus described and claimed in the following related application: SYMMETRICAL BRAKING SYSTEM FOR A GRAPHIC RECORDER, filed July 20, 1987 in the name of Robert Niemeyer, Ser. No. 07/075,530 which is hereby incorporated by reference.

FIELD OF THE INVENTION

This invention relates generally to graphic recording systems and particularly to those in which a plurality of recording elements are carried by a moveable carriage and in which a recording media is moved relative to the path of carriage motion to provide a desired recording upon the media.

BACKGROUND OF THE INVENTION

A substantial number of graphic recording systems have been developed to provide automated or computer controlled graphic recording upon a media. While the individual structures of such graphic recorders vary substantially, generally all include a media transport system in which the media is moved in a first direction and a moveable pen carriage supported and controlled to provide motion of the pen carriage in a second direction relative to media motion. In most instances, the directions of media movement and pen carriage movement are orthogonal.

With the development of computer drive systems having increased capability, there arose a need to provide graphic recording systems employing a plurality of recording pens which commonly facilitated multiple color selection.

One example of a multiple pen graphic recorder is set forth in U.S. Pat. No. 3,401,401 issued Sept. 10, 1968 to Read et al. for Multiple Pen Carriage. The device set forth in Read provides four pens supported on a moveable carriage together with a corresponding group of four independent actuating devices each operative upon one of the pens. The use of multiple actuating devices supported on the moveable carriage substantially increases the overall mass of the pen carriage which in turn substantially limits the speed and acceleration of pen carriage motion.

Another example of prior art multiple pen graphic recorders is set forth in U.S. Pat. No. 4,135,245 issued Jan. 16, 1979 to Kemplin et al. for Plotter With Automatic Pen Changer. The system set forth in Kemplin utilizes a stationary pen repository in which multiple pens are maintained. A moveable recording head is configured to receive and support a single recording pen and means are provided for interrupting the recording process in order to exchange the pen supported by the recording head with a different pen in the stationary pen repository. While the system set forth in Kemplin avoids the increase of pen carriage mass caused in the Read System, it increases the recording time due to the interruption of recording during pen substitution.

Still another example of multiple pen graphic recording systems is set forth in U.S. patent application Ser. No. 4,500,890 issued Feb. 19, 1985 to Nicholas for Graphic Recording System which is commonly owned with the present invention. The system set forth in Nicholas provides a moveable carriage supporting a plurality of recording pens together with a single actuator selectively operative upon the pens.

Still another example of multiple pen graphic recording systems is set forth in U.S. Pat. No. 4,578,683 issued Mar. 25, 1986 to Gordon and entitled Graphic Recording System which is commonly owned with the present invention. In the Gordon System, a moveable pen carriage supports a plurality of recording elements. The carriage is moveable in two directions along a path relative to the recording media and an associated actuator arm mechanism is moveably supported on a rod. The rod has its longitudinal axis generally parallel to the carriage path. Stationary operating means are coupled to the rod and are operative to move the selected pen into engagement with the recording media. The system set forth in Gordon provides substantial advantage over the prior art systems in its avoidance of powered actuating means upon the pen carriage and its reduction of overall mass of the pen carriage.

While the foregoing described prior art graphic recording systems facilitate multiple pen carriage recording and exhibit several advantages, there remains a need in the art for a graphic recording system having a lightweight moveable pen carriage and pen selecting means which simultaneously reduces overall pen carriage mass, avoids the need of supporting powered pen selection mechanisms upon the moveable carriage and provides accurate controllable pen selection and motion.

SUMMARY OF THE INVENTION

Accordingly, it is a general object of the present invention to provide an improved graphic recording system. It is a more particular object of the present invention to provide an improved graphic recording system having a low mass multiple pen carriage which avoids the need of supporting powered pen selecting apparatus upon the moveable carriage and which simultaneously facilitates pen selection and maintains accuracy of recording pen motion.

In accordance with the present invention there is provided for use in a graphic recording system having motion means for supporting and moving a pen carriage along a path, rotary actuation means comprising a pen carriage supported and moved by and under the control of the motion means, having a plurality of pen shuttle channels, a plurality of pen shuttles configured to receive a plurality of recording elements slideably supported within the plurality of pen shuttle channels; an elongated actuator beam supported in a substantially parallel arrangement with the path and rotary drive means, supported by the pen carriage, rotatable between a first position engaging the actuator beam and a second position engaging the pen carriage and selectively couplable to selected ones of the pen shuttles and operative to move the selected pen shuttles, the rotary drive means being coupled to the actuator beam such that rotation of the actuator beam causes the rotary drive means to move the selected pen shuttle.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 4 is a section view of the present invention rotary actuated graphic recording system taken along Section lines 4—4 in FIG. 3 depicting the rotary actuator in a non-engaged position;

FIG. 5 is a section view of the present invention rotary actuated graphic recording system taken along Section lines 4-4 in FIG. 3 depicting the recording position; an FIG. 6 is a section view of the present invention rotary actuated graphic recording system taken along Section line 4—4 in FIG. 3 during recording pen change.

DESCRIPTION OF THE PREFERRED EMBODIMENT

Figure 1:
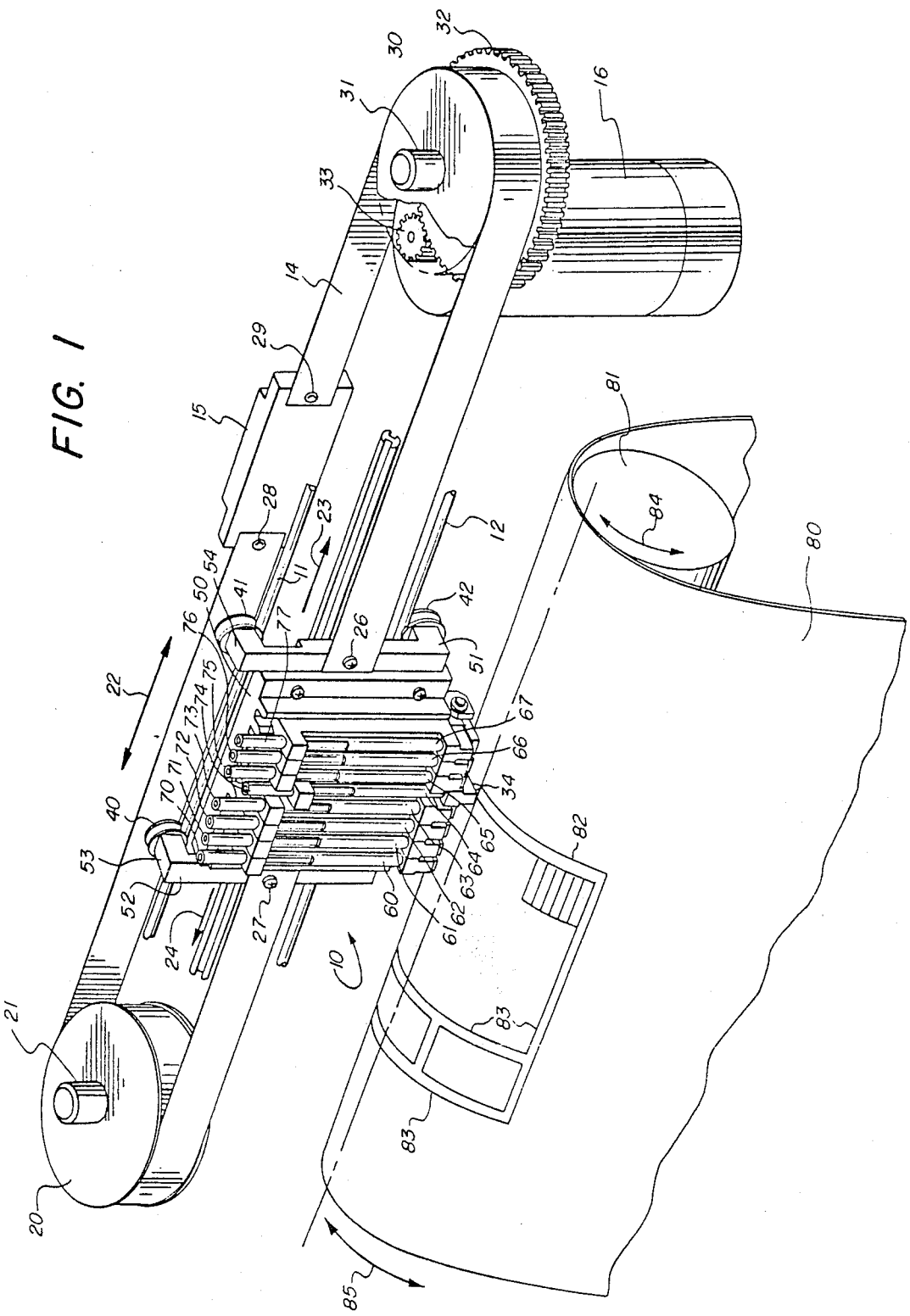
FIG. 1 is a general perspective view of a rotary actuated graphic recording system constructed in accordance with the present invention.

FIG. 1 sets forth a perspective view of a rotary actuated graphic recording system constructed in accordance with the present invention in which a moveable pen carriage generally referenced by numeral 10 is secured to and controlled by a closed flexible carriage band 14. Carriage band 14 may be fabricated from any number of flexible strong materials. However, in its preferred form it comprises a generally flat ribbon-like band of stainless steel. An upper track 11 and lower track 12 are supported parallel to the motion path of the forward portion of carriage band 14 by means not shown. It will be apparent, however, that the support of tracks 11 and 12 may include any of the presently available track support structures used in graphic recorders. The essential element of supporting tracks 11 and 12 is to provide a substantially rigid construction in which upper track 11 and lower track 12 may support the weight and resist the vibrations of pen carriage 10.

Pen carriage 10 includes a pen shuttle guide 50 which in its preferred form is formed of a lightweight, rigid, plastic material. A pair of generally U-shaped wheel support members, also preferrably formed of a lightweight, rigid, plastic material 51 and 52, are secured to pen shuttle guide 50 by means set forth below in greater detail. Wheel support 51 terminates at one end in a rearwardly extending axle support 54 and at the other end in a similar axle support 55. Wheel support 52 is identical to wheel support 51 and terminates at one end in rearwardly extending axle support 53 and a rearwardly extending axle support 56 at the other end (the latter seen in FIG. 3). A quartet of grooved wheels 40, 41, 42, and 43 (better seen in FIG. 3) are rotatably secured to axle supports 53, 54, 55, and 56 respectively. Wheels 40 through 43 are configured to receive and provide a track engagement with upper track 11 and lower track 12. The resulting cooperation of wheels 40 through 43 and tracks 11 and 12 retains pen carriage 10 in a rolling engagement with upper track 10 and lower track 12 such that pen carriage 10 is freely moveable in the directions indicated by arrows 23 and 24.

In accordance with an important aspect of the invention, pen carriage 10, by means set forth below in greater detail, supports a plurality of generally elongated pen shuttles 70 through 77 which are moveably secured to pen shuttle guide 50 in a linear array. In the preferred arrangement pen shuttles 70 through 77 are generally perpendicular to the direction of travel of pen carriage 10. Pen shuttles 70 through 77 each support a corresponding one of a plurality of pens 60 through 67 respectively such that motion of a selected one of pen shuttles 70 through 77 results in a corresponding motion of the associated pen. By way of example, FIG. 1 depicts pen shuttles 70 through 73 and 75 through 77 in their raised position while pen shuttle 74 is shown in its downwardly extending or lowered position. Correspondingly, pens 60 through 63 and 65 through 67 are supported in their raised position by a spring better shown in FIG. 4 while pen 64 is supported in its downwardly extending position.

A media drive roller 81, which may be constructed in accordance with the presently known graphic recording system media drive structures, is supported by conventional means (not shown) such that its major axis is generally parallel to the travel path of pen carriage 10. A flexible media 80 comprising a long sheet representative of a typical media material is supported by media roller 81 such that rotational motion of media roller 81 in the path indicated by arrows 84 results in a corresponding linear motion of media 80.

A pair of pulleys 20 and 30 are rotatably supported by a pair of pulley supports 21 and 31 respectively. By means not shown but which may include any conventional pulley support mechanism, pulleys 20 and 30 are supported at opposite ends of the travel path of carriage band 14. The respective ends of carriage band 14 are joined by a pair of fasteners 28 and 29 to an elongated counter weight 15. Except for the gap at counterweight 15, carriage band 14 comprises a continuous ribbon of material extending from fastener 28 around pulley 20 through pen carriage 10 and around drive pulley 30 to fastener 29. As a result, carriage band 14 extends through pen carriage 10 by means set forth below in greater detail. Pulley 20 comprises a free moving idler pulley while drive pulley 30 supports a ring gear 32. A carriage motor 16 which may comprise any of the number of presently available bidirectional electric motors supports a drive gear 33 which in accordance with generally accepted principles of graphic recorder construction is operatively coupled to the armature of carriage motor 16 (not shown) such that energizing carriage motor 16 results in rotating gear 33. Drive pulley 30 is supported with respect to gear 33 such that gear 33 engages gear 32 causing drive pulley 30 to rotate in response to energizing of carriage motor 16. By means not shown, but in accordance with generally accepted fabrication techniques, carriage band 14 is maintained in tension to provide effective coupling of motion between drive pulley 30 and carriage band 14. As a result, rotational drive pulley 30 produces corresponding motion of carriage band 14 in the path indicated by arrow 22 which in turn produces a corresponding motion of pen carriage 10 in the path indicated by arrows 23 and 24.

An elongated actuator beam 13 is supported in a substantially parallel relationship with the travel path of pen carriage 10 by means not shown. In accordance with an important aspect of the present invention, actuator beam 13 is operatively coupleable to selected ones of pen shuttles 70 through 77 to produce vertical motion of a selected one of pens 60 through 67.

In operation, electronic control means constructed in accordance with generally accepted graphic recording system techniques are operative to cause motor 16 to drive carriage band 14 and thereby pen carriage 10 back and forth along the travel path indicated by arrows 23 and 24 to produce motion of pen carriage 10 in either of two directions along the carriage travel path. Concurrently, the electronic control means are operatively coupled to media roller 81 through conventional fabrication techniques to rotate media roller 81 in either of the directions indicated by arrow 84 and cause a corresponding motion of media 80 in either of the directions indicated by arrow 85. By means set forth below in greater detail and in accordance with an important aspect of the present invention, a selected pen shuttle such as pen 74 is moved by rotation of actuator beam 13 in a downward direction until pen point 34 of pen 64 contacts the surface of media 80. Thereafter, under control of the electronic control means, combinations of pen carriage motion in directions indicated by arrows 23 and 24 together with coordinated motions of media 80 in the directions indicated by arrow 85 result in recording a plurality of line markings 83 upon media 80.

While pens 60 through 67 may comprise recording pens having a variety of pen characteristics, most commonly pens 60 through 67 will be selected to provide different color recording pens. Accordingly, by means set forth below in greater detail, operation of actuator beam 13 and the present invention rotary pen actuation (described below) cooperate with carefully controlled motion of pen carriage 10 to permit the selective use of the desired one of pens 60 through 67. As mentioned, the operation of the present invention rotary pen actuation is set forth below in greater detail. However, suffice it to note here that in accordance with an important aspect of the present invention no electrical power connections are made to pen carriage 10. That is to say, there are no electrically powered pen actuation or selection means carried or supported by pen carriage 10. The selection of the desired one of pens 60 through 67 is achieved entirely by the cooperation of passive elements supported by pen carriage 10 which in turn are driven by stationary powered actuation means. Accordingly, and in accordance with an important aspect of the present invention, the overall mass of pen carriage 10 is not encumbered by the additional mass of electrical power actuating devices and their associated flexible wires.

Figure 2:
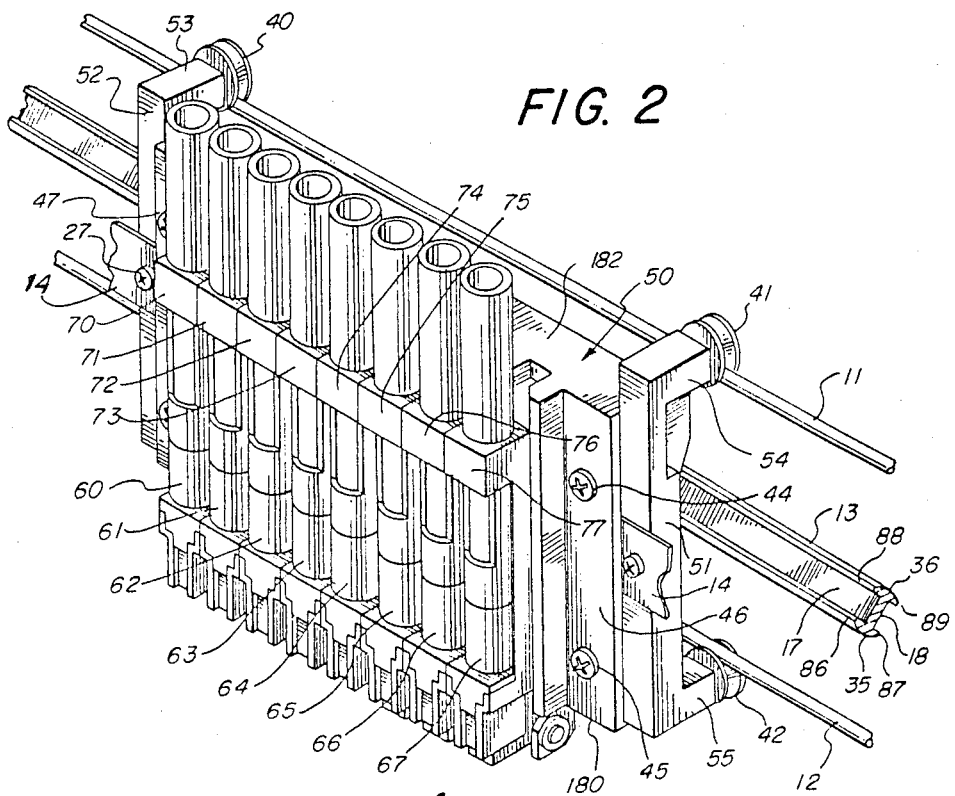
FIG. 2 is a front perspective view of the moveable pen carriage of the present invention rotary actuated graphic recording system.

FIG. 2 sets forth an enlarged and more detailed front perspective view of pen carriage 10. As mentioned above, pen carriage 10 is carried upon upper track 11 and lower track 12 by a quartet of grooved wheels 40 through 43 (the latter seen in FIG. 3). Pen shuttle guide 50 includes a rigid top 182 and rigid base 180 forming the upper end lower sides of the generally rectangular configuration of pen shuttle guide 50. Top 182 and base 180 of pen shuttle guide 50 are joined by a generally planar flange portion 46 on one side and an identical planar flange portion 47 on the other. In the preferred form, top 182, base 180 and flange portions 46 and 47 are combined in a single molded unit.

As mentioned, wheel supports 51 and 52 are identical in construction and therefore the following description of structure and the attachment of wheel support 51 to flange 46 should be understood to also describe the structure of wheel support 52 and its attachment to flange 47. As is better seen in FIG. 3, wheel support 52 defines a pair of inwardly extending tabs 57 and 58 which in turn define threaded apertures 69 and 68. Tabs 57 and 58 extend behind flange portion 46 of pen shuttle guide 50. A pair of threaded fasteners 44 and 45 extend through underlying apertures in flange portion 46 (not shown) and are threadably received within apertures 69 and 68 respectively to secure wheel support 51 to flange portion 46 of pen shuttle guide 50. A similar attachment occurs between wheel support 52 and flange portion 47 on the other side of pen shuttle guide 50. As is also set forth above, carriage band 14 is formed of a thin ribbon of stainless steel and extends uninterrupted through the entire structure of pen carriage 10. In accordance with an important aspect of the present invention, the configuration of pen carriage 10 which permits carriage band 14 to extend through its operative structure avoids subjecting the elements of pen carriage 10 to the tension existing in carriage band 14. But for this configuration the tension in carriage band 14 would be imposed upon the structural elements of carriage 10 requiring greater strength and therefore greater mass in the pen carriage. In the present invention structure however, the entire attachment of carriage band 14 to pen carriage 10 is provided by a pair of threaded fasteners 29 and 27 which pass through apertures in carriage band 14 (not shown) and are threadably received within wheel supports 51 and 52 respectively in a conventional threaded attachment to fastener 59 on wheel support 52 (seen in FIG. 3) and a similar fastener on wheel support 51 (not shown).

Actuator beam 13 defines a pair of longitudinally extending parallel channels 17 and 18 and an opposed pair of convex surfaces 35 and 36. In addition, actuator beam 13 defines a pair of longitudinally extending flat surfaces 88 and 89 at each side of convex surface 36 and a pair of similar flat surfaces 86 and 87 at each side of convex surface 35. The functional importance of channels 17 and 18, convex surfaces 35 and 36 and flat surfaces 87 through 89 are set forth below in greater detail. However, suffice it to note here that actuator beam 13 comprises an elongated member having a substantially constant cross-section formed in an approximate I-beam shape.

Figure 3:
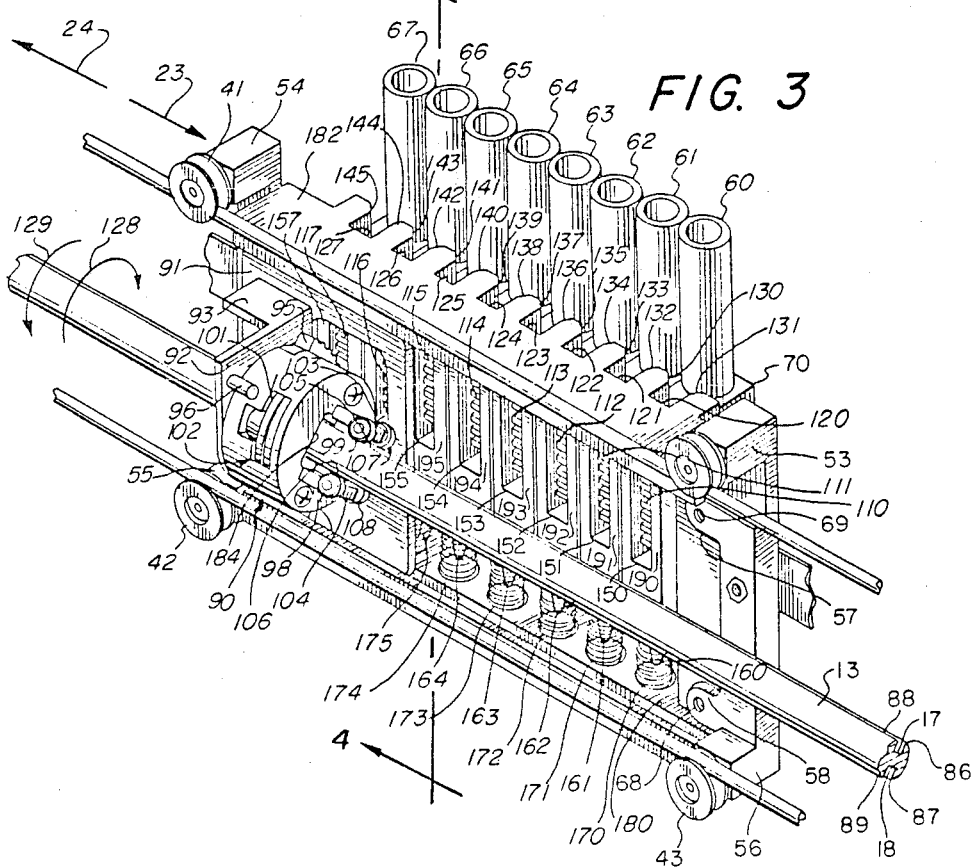
FIG. 3 a rear perspective view of the moveable pen carriage of the present invention rotary actuated graphic recording system.

FIG. 3 sets forth a rear perspective view of pen carriage 10. As set forth above, pen carriage 10 is supported upon upper track 11 and lower track 12 by grooved wheels 40 through 43. As is also set forth above, pen carriage 10 defines a pen shuttle guide 50 which comprises a generally rectangular frame member and which is secured to wheel supports 51 and 52 in a precise alignment with upper track 11 and lower track 12. Top 182 of pen shuttle guide 50 defines a plurality of vertically extending pen channels 120 through 127 which are parallel to each other and substantially orthogonal to upper track 11 and lower track 12. Pen shuttle channel 120 defines a pair of inwardly extending angled surfaces 130 and 131 which extend the entire length of pen shuttle channel 120. Similarly, pen shuttle channel 121 defines a pair of angled surfaces 132 and 133, pen shuttle channel 122 defines a pair of angled surfaces 134 and 135, pen shuttle channel 123 defines a pair of angled surfaces 136 and 137, pen shuttle channel 124 defines angled surfaces 138 and 139, pen shuttle channel 125 defines angled surfaces 140 and 141, pen shuttle channel 126 defines angled surfaces 142 and 143, and pen shuttle channel 127 defines angled surfaces 144 and 145. By means set forth below in greater detail, pen shuttles 70 through 77 are received within pen shuttle channels 120 through 127 respectively and include bearing structures cooperating with the respective angled surfaces of pen shuttle channels 120 through 127 to provide a precise travel path for each of pen shuttles 70 through 77. A plurality of pen shuttle backs 190 through 197, the structures of which are set forth below in greater detail, are secured to pen shuttles 70 through 77 respectively by means of attachment also set forth below in greater detail. However, it is sufficient to note here that the attachment between pen shuttle backs 190 through 197 and pen shuttles 70 through 77 respectively captivates pen shuttles 70 through 77 in sliding engagement with pen shuttle channels 120 through 127 respectively. Pen shuttles 70 through 77 are biased to their raised positions shown in FIGS. 2 and 3 by a plurality of coiled springs 170 through 177 (springs 176 and 177 not shown). In other words, pen shuttles 70 through 77 are slideably moveable within pen channels 120 through 127 respectively and are maintained in their top most positions within channels 120 through 127 by the biasing of springs 170 through 177 respectively. However, springs 170 through 177 are selected to have spring constants which may be overcome and which permit pen shuttles 70 through 77 to be moved downwardly to the extended position shown occupied by pen 74 in FIG. 1. This downward position of course, corresponds to the extension of the recording pens which permits recording upon the media.

Pen shuttle backs 190 through 197 are of identical construction and define a plurality of elongated apertures 150 through 157 respectively. In accordance with an important aspect of the present invention, a plurality of gear racks 110 through 117 are supported within apertures 150 through 157 respectively in a substantially vertical arrangement. Gear racks 110 through 117 comprise generally planar members having a plurality of longitudinally extending parallel gear teeth in a straight line arrangement.

As mentioned above, actuator beam 13 extends parallel to upper track 11 and lower track 12 and is spaced from tracks 11 and 12 by a predetermined distance which is constant over the entire travel track of pen carriage 10. Base 180 defines a downwardly extending channel 181 extending its entire length and top 182 defines a similar channel 183 extending upwardly across the entire length of pen shuttle guide 50. A generally planar drive carriage 91 is received within channels 181 and 183 and supported thereby in a vertical position substantially parallel to pen shuttle backs 190 through 197. In accordance with an important aspect of the present invention, drive carriage 91 is captivated within channels 181 and 183 in a precise fit which maintains the vertical position of drive carriage 91 accurately while permitting drive carriage 91 to be readily moved back and forth across pen shuttle guide 50 for reasons set forth below in greater detail.

A generally planar support flange 92 is perpendicular to and joined to drive carriage 91. A gear stop 96 comprising a generally cylindrical extension is joined to support flange 92. While not visible in FIG. 3, support flange 92 also defines an aperture through which actuator beam 13 passes. The size of the aperture in support flange 92 is substantially greater than the dimensions of actuator beam 13 thereby permitting support flange 92 to move freely with respect to actuator beam 13. A generally planar support 93 is joined to drive carriage 91 and the upper edge of support flange 92 to strengthen the attachment of support flange 92 to drive carriage 91. A rotary drive 90 comprises a generally cylindrical housing 100 defining a substantially rectangular center aperture 184 (better seen in FIG. 4) and a irregularly shaped aperture 101. A pair of generally rectangular bearing supports 103 and 104 are joined to and supported by the front surface of drive housing 100 adjacent opposite sides of aperture 184. Bearing support 103 supports an inwardly facing bearing 105 and transversely facing bearings 99 and 107. Similarly, bearing support 104 supports an inwardly facing bearing 106 and transversely facing bearings 98 and 108. A curved gear 95 extends outwardly from drive housing 100 and defines a radius of curvature slightly greater than that of drive housing 100. A shaft brake mechanism 102 is supported within drive housing 100 and is set forth below in greater detail.

Drive housing 100 is rotatably supported upon support flange 92 and is rotatable in the counterclockwise direction to a maximum counterclockwise position in which gear 95 abuts gear stop 96. In the fully counterclockwise position, gear 95 assumes the position shown in FIG. 6. As drive housing 100 is rotated from its maximum counterclockwise position, gear 95 moves to a position in which it extends through aperture 94 in drive carriage 91 and into the one of apertures 150 through 157 which are aligned with gear 95. In the position shown in FIG. 3, gear 95 is in alignment with aperture 157 of pen shuttle back 197 and therefore extends through aperture 177 therein. With continued clockwise rotation of drive housing 100, gear 95 engages gear rack 117 of pen shuttle back 197. Thereafter, further clockwise rotation of drive housing 100 causes a downward force to be exerted upon gear rack 117 which in turn overcomes the spring biasing force of spring 177 (not shown) and begins to move pen shuttle 77 in the downward direction. Finally, the clockwise motion of drive housing 100 moves gear rack 117 and pen shuttle 77 in the downward direction until the point of the selected pen contacts the media.

As mentioned above, actuator beam 13 extends through aperture 184 in drive housing 100 and a second aperture (not seen) in flange support 92. As a result, actuator beam 13 extends completely through rotary drive 90 and rotary drive 90 is freely moveable with respect to actuator beam 13. As is also mentioned above, actuator beam 13 defines a general I-beam cross-section in which a pair of opposed longitudinal channels 17 and 18 extend the entire length of the actuator beam and in which a convex surfaces 35 and 36 extend outwardly from channels 17 and 18 on opposite ends thereof. A pair of flat surfaces 88 and 89 are defined on either side of convex surface 36 and a corresponding pair of flat surfaces 86 and 87 are defined on either side of convex surface 35. With respect to rotary drive 90, it should be noted that bearing supports 103 and 104 are positioned generaly parallel to actuator beam 13. It should be further noted that bearing supports 103 and 104 are spaced from and oriented with respect to actuator beam 13 and aperture 184 such that inwardly facing bearings 105 and 106 are received within channels 17 and 18 respectively and transverse bearings 98, 99, 107 and 108 engage flat surfaces 86 and 87. As a result, the cooperation of bearings 98, 99, 105, 106, 107 and 108 of rotary drive 90 and channels 17 and 18 of actuator beam 13 facilitate a mechanical coupling between drive housing 100 and actuator beam 13 without restricting the free movement of rotary drive 90 with respect to actuator beam 13. The extension of bearings 105 and 106 into channels 17 and 18 provides a coupling engagement between actuator beam 13 and drive housing 100 in which rotational motion of actuator beam 13 causes a corresponding rotational motion of drive housing 100. In other words, rotation of actuator beam 13 in the direction indicated by arrow 128 causes the above-described clockwise rotation of drive housing 100 and rotation of actuator beam 13 in the direction indicated by arrow 129 causes the above-described counterclockwise rotation of drive housing 100.

As mentioned above, housing 100 supports an internal brake mechanism 102, which is set forth below in greater detail. However, suffice it to note here that brake mechanism 102 is operative in response to counterclockwise rotation of actuator beam 13. As gear 95 is rotated toward gear stop 96, brake mechanism 102 engages convex surfaces 35 and 36 to secure rotary drive 90 to actuator beam 13. In its preferred operation, brake 102 engages beam 13 while gear 95 is approximately fifteen degrees away from gear stop 96. In accordance with the operation described below, the securing of brake 102 to convex surfaces 35 and 36 is released when actuator beam 13 is rotated in the clockwise direction from its maximum counterclockwise position.

In operation, pen carriage 10 is moveable, as described above, upon tracks 11 and 12 in the directions indicated by arrows 23 and 24. All motion of pen carriage 10 in the directions indicated by arrows 23 and 24 is imparted by carriage band 14 in accordance with the above-described actions of carriage motor 16, drive pulley 30 and gears 32 and 33. Because drive carriage 91 is freely moveable with respect to pen carriage 10 within channels 181 and 183 of pen shuttle guide 50, rotation of actuator beam 13 to its specific counterclockwise position (seen in FIG. 6) causes brake 102 to grasp convex surfaces 35 and 36 and maintains the position of rotary drive 90 upon actuator beam 13 notwithstanding motion of pen carriage 10. Accordingly, with actuator beam 13 in the specific counterclockwise position and rotary drive 90 secured to actuator beam 13, motion of pen carriage 10 produces a relative motion between rotary drive 90 and pen carriage 10. Because pens 60 through 67 are arranged in a linear array along the direction of travel of pen carriage 10, selection of a desired one of pens 60 through 67 for recording use is accomplished by locking rotary drive 90 to actuator beam 13 by counterclockwise motion and thereafter moving pen carriage 10 until gear 95 of rotary drive 90 is aligned with the one of apertures 110 through 117 in the pen carriage back corresponding to the desired pen Specifically, with the relative positions of pen carriage 10 and rotary drive 90 shown in FIG. 3 in which gear 95 is aligned with aperture 157 of pen shuttle back 197 corresponding to pen 67, the desired one of the remaining pens 60 through 66 is selected by rotating actuator beam 13 to lock rotary drive 90 to actuator beam 13. Next, pen carriage 10 is moved in the direction indicated by arrow 24 until gear 95 is brought into alignment with the aperture in the pen shuttle back corresponding to the desired pen. For example, in the event pen 63 is selected for next use, pen carriage 10 is moved in the direction of arrow 24 until gear 95 is aligned with aperture 153 in pen shuttle back 193. Thereafter, pen carriage 10 is momentarily stopped while actuator beam 13 is rotated in the clockwise direction indicated by arrow 128 which simultaneously releases brake 102 and moves gear 95 into aperture 153. Once brake 102 is released and gear 95 extends into aperture 153 of pen shuttle back 193, motion of pen carriage 10 in either of the directions indicated by arrows 23 or 24 may be resumed. At this point, gear 95 assumes the position shown in FIG. 4 which corresponds to the "rest position" of the actuator system. Pen 63 has not yet been brought into a downward movement to facilitate contact with the media. Once pen carriage 10 has reached the position over the media at which it is desired to begin recording upon the media, actuator beam 13 is rotated in the clockwise direction indicated by arrow 128 to cause gear 95 to engage rack 113 and drive pen shuttle 73 and thereby pen 63 downward until contact with the media is established. With contact established with the media by pen 63, the motions of pen carriage 10 and the media set forth in descriptions accompanying FIG. 1 is undertaken to carry out the plotting operation. Note that the shape of the first tooth or leading edge of gear 95 is shaped so that after a short rotation, gear 95 will engage with the selected one of gear racks 110 through 117 properly.

At some point it may be desired to disengage pen 63 and select another pen for example, pen 60. The pen changing operation is initiated by rotating actuator beam 13 toward its specific counterclockwise position and momentarily stopping the motion of pen carriage 10. As actuator beam 13 rotates drive housing 100 in the counterclockwise direction, pen 63 is raised by the action of gear 95 and the force provided by spring 173. Continued counterclockwise rotation of actuator beam 13 and thereby drive housing 100 causes gear 95 to move out of engagement with gear rack 103 leaving pen shuttle 73 in its rest position once housing 100 reaches its specific counterclockwise rotation brake 102 again engages actuator beam 13 and secures the position of rotary drive 90. Thereafter, pen carriage 10 is moved once again the direction indicated by arrow 24 until gear 95 is brought into alignment with aperture 150 of pen shuttle back 190. A clockwise rotation of actuator beam 13 causes gear 95 to extend into aperture 150 and engage rack 110. Once gear 95 extends into aperture 150, brake 102 is released and motion of pen carriage 10 may be resumed. The extension of gear 95 into aperture 150 of pen shuttle back 190 is sufficient to maintain the alignment of rotary drive 90 with aperture 150 causing rotary drive 90 to be carried along with pen carriage 10. With rotary drive 90 thus engaged in alignment with aperture 150 of pen shuttle back 190, each motion of pen carriage 10 produces a corresponding motion of rotary drive 90.

Because of the above-described operation of bearings 98, 99 and 105 through 108, the movement of rotary drive 90 during pen carriage motion is facilitated and imposes no additional stress upon the pen carriage drive system. When pen carriage 10 reaches the position over the media in which it is desired to begin plotting with pen 60, actuator beam 13 is rotated in the clockwise direction causing gear 95 to engage rack 110 and drive pen shuttle 70 and thereby pen 60 downward until pen 60 contacts and records against the media. During the recording process with pen 60 extended downward, gear 95 continues to extend into aperture 150 and as a result, rotary drive 90 continues to be carried along by pen carriage 10 in its motions in the directions indicated by arrows 23 and 24.

Thus, pen selection is performed by simply securing rotary drive 90 at a fixed position with respect to actuator beam 13 by counterclockwise rotation of actuator beam 13 to a predetermined position and moving carriage 10 until the appropriate pen is aligned. Rotation of actuator beam 13 cause rotary drive 90 to engage pen carriage 10 at the point corresponding to the selected pen causing rotary drive 90 to be carried by pen carriage 10. It should be noted rotary drive 90 continues to be carried by pen carriage 10 in either the rest position or the recording position. As a result, vertical pen motions in and out of engagement with the media necessary to undertake the above-described plotting operation, simply require rotation of actuator beam 13 to raise and lower the operative pen.

Simply stated, pen selection is accomplished by counterclockwise rotation of actuator beam 13 to lock rotary drive 90, alignment of rotary drive 90 with the desired pen by movement of pen carriage 10 and clockwise rotation of actuator beam 13 to engage the desired pen. As will be apparent to those skilled in the art, the foregoing described rotary actuation provides substantial advantages over the prior art systems and is accomplished without any powered devices being born by pen carriage 10.

FIGS. 4, 5 and 6 set forth partially sectioned views of pen carriage 10 and rotary drive 90 and depict different positions of rotary drive 90.

FIG. 4 sets forth the rotary actuator of the present invention in the rest position in which a selected pen has been engaged but is not moved into the recording position. FIG. 5 sets forth the rotary actuator with the selected pen in the write or record position. FIG. 6 sets forth the rotary actuator in which rotary drive 90 is completely disengaged from pen carriage 10.

With respect to FIG. 4, pen shuttle guide 50 defines a top 182 having an upwardly extending channel 183 and a base 180 having a downwardly extending channel 181. Pen shuttle guide 50 defines a pen channel 127, the structure of which is set forth above. Pen shuttle 77 supports pen 60 in a vertical position and defines a pair of inwardly extending generally cylindrical bosses 198 and 199. Pen shuttle 77 further supports a plurality of ball bearings 202, 203, 204 and 205 as well as an additional similar plurality of the ball bearings (not seen) on the other side of rib 109. The function of ball bearings associated with rib 109 of pen shuttle 77 is to provide a suitable rolling bearing for sliding contact with angled surfaces 144 and 145 of pen shuttle channel 127. Bosses 198 and 199 are received within pen shuttle back 197 and secured thereto by a pair of threaded fasteners 200 and 201. As mentioned, pen shuttle back 197 defines an aperture 157 within which gear rack 117 is supported. Gear rack 117 defines a generally tapered surface 118. A generally flat edge 185 forms the bottom surface of aperture 157. Pen shuttle back 197 further defines a generally conical, downwardly extending spring guide 167. Base 180 further defines a recess 146. A coiled spring 177 is compressively supported at one end within recess 146 and at the other end by its encircling of spring guide 167. While any number of springs may be used for spring 177, it has been found advantageous to use a combination of a left hand and right hand wound nested pair. Actuator beam 13 extends through aperture 184 in rotary drive housing 100 and is engaged by bearings 98, 99 and 105 through 108 as described above. Drive housing 100 is supported by support flange 92 and gear 95 extends outwardly from drive housing 100. A pen cap 206 is pivotally supported beneath base 180 by a pin 209. Pen cap 206 further defines a gear portion 207 concentrically positioned with respect to pin 209. Pen shuttle 77 defines a gear rack 208 which engages gear portion 207.

In the position shown in FIG. 4, rotary drive 90 is in the rest position in which gear 95 extends into aperture 157 of pen shuttle back 197 and in which brake 102 is disengaged from actuator beam 13. In this position, and as described above, rotary drive 90 is freely carried by the motion of pen carriage 10 and pen 67 is removed from contact with the media. Gear 95 defines a lower edge 186 which, in the rest position, is in contact with lower edge 185 of aperture 157. The compressive force of spring 177 urges pen shuttle 77 upwardly to a position in which the upper portion of pen shuttle back 197 abuts the under surface of top 182 of pen shuttle guide 50. Once actuator beam 13 is rotated in the clockwise direction causing drive housing 100 and gear 95 to be rotated in the clockwise direction, a downward force is applied to edge 185 of aperture 157 by edge 186 of gear 95. This force overcomes the force of spring 177 and moves pen shuttle back 197 and thereby pen shuttle 77 downwardly. With continued rotation of drive housing 100, gear 95 engages gear rack 117 and the downward motion of pen shuttle 77 continues. It should also be noted that pen cap 206 is in its closed position when pen shuttle 77 is in the rest position shown in FIG. 4.

FIG. 5 is identical to FIG. 4 with the exception that pen 67 has been moved to the recording position in which drive housing 100 is rotated in the clockwise direction causing gear 95 and rack 117 to cooperate to drive pen shuttle 77 downward until pen 67 contacts the media. If no pen to media contact occurs, pen shuttle back 197 abuts base 180 of pen shuttle guide 50 and pen 67 receives its maximum downward extension. In either event, spring 177 is compressed within recess 146 in base 180 and is captivated by the extension of spring guide 167 into recess 146. It should be noted that in the position shown in FIG. 5, brake 102 is out of contact with actuator beam 13 and rotary drive 90 is released from any engagement with actuator beam 13. This permits the above-described motion of the combination of rotary drive 90 and pen carriage 10 as pen 67 is used to record upon the media. With pen shuttle 77 in its downward position, gear rack 208 pivots gear portion 207 and pen cap 206 to expose pen point 189.

FIG. 6 sets forth the present invention system in which rotary drive 90 is completely disengaged from pen shuttle 77. In the position shown, actuator beam 13 and thereby drive housing 100 are shown rotated in the maximum counterclockwise direction bringing gear 95 into contact with gear stop 96. As can be seen, the absence of force applied to pen shuttle 77 by gear 95 results in permitting spring 177 to again return pen shuttle 77 to its maximum upward vertical travel. It should also be noted that gear 95, in its maximum counterclockwise position shown, no longer engages pen shuttle back 197. It should be further noted that brake 102 is in contact with actuator beam 13 which, as mentioned above, causes rotary drive 90 to remain in a fixed position upon actuator beam 13. While the preferred form of brake 102 is set forth in the above-referenced related application for SYMETRICAL BRAKE, Ser. No. 07/075,530, it will be apparent to those skilled in the art that any number of brake structures may be used for brake 102. In addition, pen cap 206 has returned to its closed position once pen shuttle 77 is raised.

What has been shown is a rotary actuated graphic recording system in which a graphic recording system having a lightweight moveable pen carriage and pen selecting means which simultaneously reduces overall pen carriage mass, avoids the need of supporting powered pen selection mechanisms upon the moveable carriage and provides accurate controllable pen selection and motion.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. In a graphic recording system having motion means for supporting and moving a pen carriage along a path, rotary actuation means comprising:
   a pen carriage supported and moved by and under the control of said motion means, having a plurality of pen shuttle channels;
   a plurality of pen shuttles configured to receive a plurality of recording elements slideably supported within said plurality of pen shuttle channels;
   an elongated actuator beam supported in a substantially parallel arrangement with said path; and
   rotary drive means, supported by said pen carriage, rotatable between a first position engaging said actuator beam and a second position engaging said pen carriage and selectively couplable to selected ones of said pen shuttles and operative to move said selected pen shuttles, said rotary drive means being coupled to said actuator beam such that rotation of said actuator beam causes said rotary drive means to move said selected pen shuttle.

2. Rotary actuation means as set forth in claim 1 wherein said pen carriage defines a linear array of pen channels and wherein said plurality of pen shuttles is supported in a linear array.

3. Rotary actuation means as set forth in claim 2 wherein said rotary drive means include brake means operative to grasp said actuator beam in said first position.

4. Rotary actuation means as set forth in claim 3 wherein said rotary drive means are slideably supported by said pen carriage and moveable along said linear array and wherein selection of a selected one of said pen shuttles is achieved by rotating said rotary drive means to said first position and moving said pen carriage to align said rotary drive means with the selected pen shuttle.

5. Rotary actuation means as set forth in claim 4 wherein said pen shuttles each define apertures and wherein said rotary drive means includes an outwardly extending curved gear member which extends into said aperture of said selected pen shuttle in said second position.

6. Rotary actuation means as set forth in claim 5 wherein said pen shuttles each define a straight gear rack supported within said aperture, said gear rack engaging and cooperating with said curved gear to move said pen shuttle in response to rotation of said rotary drive means.

7. Rotary actuation means as set forth in claim 6 wherein said pen carriage includes a plurality of spring means upwardly biasing said pen shuttles.

8. For use in a graphic recording system of the type in which a media is moved in a media path and in which a pen carriage supporting a plurality of recording elements is supported and moved in a carriage path different from said media path, rotary actuation means for selectively actuating said plurality of recording elements comprising .
   a pen carriage supporting a plurality of recording elements in a linear array, said recording elements being slideably moveable with respect to said pen carriage between a position contacting said media and a position not contacting said media;
   an elongated actuator beam supported in a substantially parallel alignment with said carriage path;
   rotary drive means coupled to said actuator beam and supported by said pen carriage and moveable between positions within said linear array in which said rotary drive means are aligned with a selected one of said recording elements, said rotary drive means rotatable between a first position in which said rotary drive means engage said aligned selected one of said recording elements and said pen carriage, a second position in which said aligned selected one of said recording elements is moved into its position contacting said media, and a third position disengaged from said recording elements and said pen carriage and engaging said actuator beam.

9. Rotary actuation means as set forth in claim 8 wherein the alignment of said rotary drive means with a selected recording element is accomplished by movement of said pen carriage while said rotary drive means are in said third position.

10. Rotary actuation means as set forth in claim 9 wherein said rotary drive means are rotated between and maintained in said first, second and third positions by said actuator beam.

11. Rotary actuation means as set forth in claim 10 wherein said rotary drive means include brake means operative in said third position of said rotary drive to engage said actuator beam.

12. Rotary actuation means as set forth in claim 11 wherein said pen carriage includes a plurality of spring means biasing said recording elements out of contact with said media and wherein said rotary drive means are operative to overcome said spring means in moving a selected recording element to a position contacting said media.

* * * * *